United States Patent [19]

Durham

[11] Patent Number: 4,728,218
[45] Date of Patent: Mar. 1, 1988

[54] LOCKING KEY MECHANISM

[76] Inventor: Roger O. Durham, 1370 Thompson St., Glendale, Calif. 91201

[21] Appl. No.: 860,456

[22] Filed: May 7, 1986

[51] Int. Cl.⁴ .......................... F16B 21/10; F16D 1/08
[52] U.S. Cl. .................................... 403/319; 403/359; 74/594.1
[58] Field of Search ............................ 74/594.1, 594.2; 403/358, 359, 344, 315, 319

[56] References Cited

U.S. PATENT DOCUMENTS

| | | | |
|---|---|---|---|
| 510,620 | 12/1993 | Smith | 74/594.1 |
| 573,055 | 12/1896 | Valentine | 74/594.1 |
| 1,637,520 | 8/1927 | Doge | 403/121 |
| 3,385,129 | 5/1968 | Duncan et al. | 403/359 |
| 3,836,271 | 9/1974 | Coski | 403/355 |
| 4,009,623 | 3/1977 | Smith et al. | 74/594.1 |

FOREIGN PATENT DOCUMENTS

| | | | |
|---|---|---|---|
| 64643 | 12/1891 | Fed. Rep. of Germany | 74/594.1 |
| 11284 | of 1891 | United Kingdom | 74/594.1 |
| 18636 | of 1891 | United Kingdom | 74/594.1 |
| 6915 | of 1894 | United Kingdom | 74/594.1 |
| 5520 | of 1896 | United Kingdom | 74/594.1 |

Primary Examiner—Randolph A. Reese
Assistant Examiner—Anthony Knight

[57] ABSTRACT

A locking key prevents a slotted boss, which is secured to a spindle by a pinch bolt, from working its way off the spindle, or, in some cases, from twisting excessively in relation to the spindle.

The locking key is positioned within the slot of the boss, has a hole which the pinch bolt goes through, and has a tang which engages a hole in the spindle, thus forming a loose link between the spindle and the pinch bolt. An anti-rotation tab of the locking key prevents the locking key from rotating about the pinch bolt, and prevents the tang from coming out of the tang hole in the spindle. To remove the boss, the pinch bolt must be withdrawn. The device is applicable to splined, serrated, keyed, or cylindrical spindles mounting corresponding bosses.

6 Claims, 7 Drawing Figures

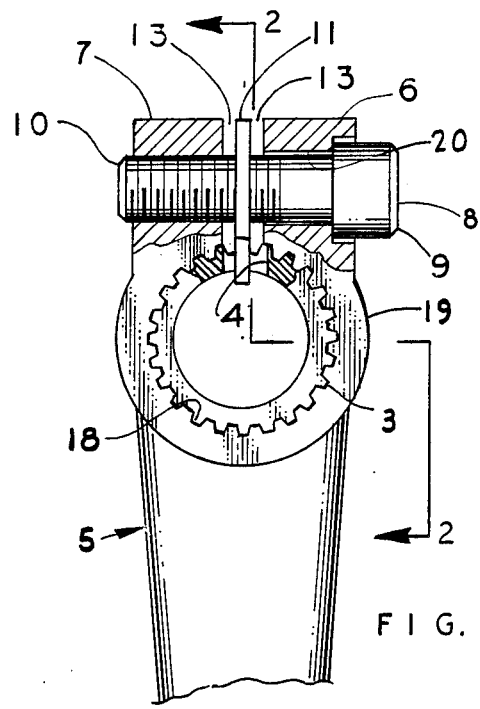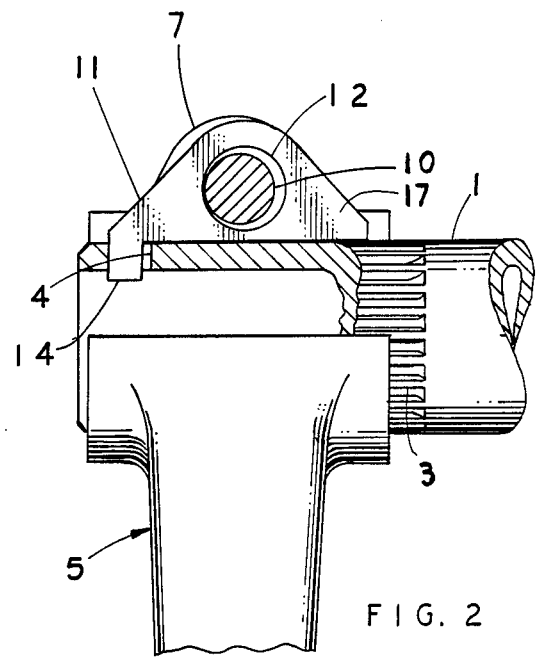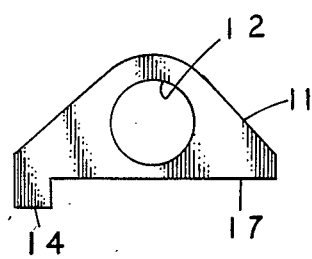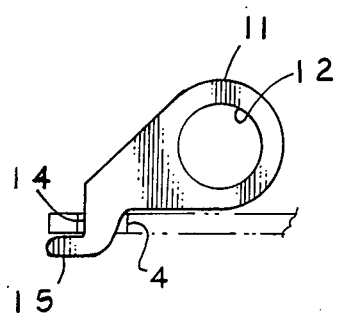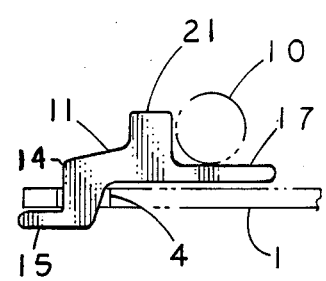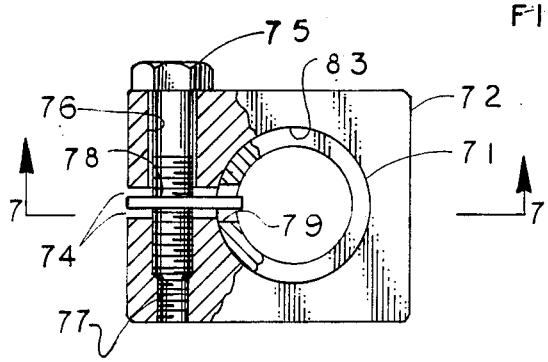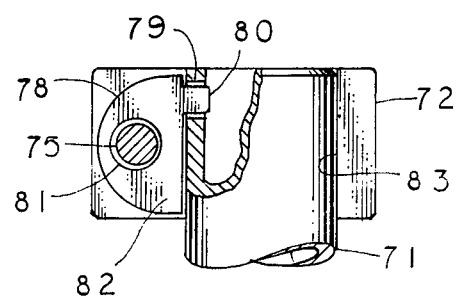

LOCKING KEY MECHANISM

BACKGROUND OF THE INVENTION

This invention pertains to bosses which are slotted and are secured to spindles by a pinch bolt which draws the ends of the bosses onto the spindle. Such spindles may be serrated, splined, keyed, or cylindrical. It particularly pertains to serrated bicycle crankshaft spindles which mount internally-serrated crank arm bosses, which are slotted and have a pinch bolt which secures them to the spindle. It also pertains to slotted stem bosses which are secured to cylindrical bicycle steering tubes by a pinch bolt.

Where bicycle crank arms are secured to serrated spindles by a pinch bolt, the arm is apt to work its way off the spindle, even though it is tightly clamped by the pinch bolt, in an installation showing no looseness between the arm and the spindle. Without some means of locking the arm to the spindle, a crank arm can move $\frac{1}{2}''$ off a spindle in as little as 10 minutes of cycling.

In some bicycles, the handlebars are secured to a handlebar stem, and the handlebar stem is secured to a slotted stem boss, which is in turn secured to a cylindrical steering tube by a pinch bolt.

Where such a slotted stem boss is secured to a cylindrical steering tube of a bicycle, some means for positively preventing the boss from coming off. Also, a device is needed to keep such a stem boss from an excessive amount of turning, in the event of a loose or broken pinch bolt; some turning is acceptable, since it would not cause loss of control.

Several devices have been used to prevent bosses of both types from coming off, such as snap rings, end bolts and washers, or by machining a groove in the spindle to partially engage the pinch bolt, such that the boss can't be removed from the spindle without first withdrawing the pinchbolt from the arm.

Each of these devices has at least one disadvantage:

Snap rings require an additional length of spindle, protruding beyond the end of the boss, which may interfere with the cyclist's ankle, and which require extra machining, and require snap ring installation tools to mount or remove the snap rings.

Machining a groove in the spindle weakens the spindle, particularly if the pinch bolt is positioned in the middle of the boss, as it usually is. Such grooves must either be turned in a lathe or milled.

End bolts and washers add extra weight and require extra machining. They also protrude and may interfere with a cyclist's ankle.

SUMMARY OF THE INVENTION

In the current invention, a locking key is positioned in the slot of a boss, which is secured to a spindle by a pinch bolt. The body of the pinch bolt inserts through a hole in the locking key. A tang of the locking key engages a hole in the spindle, near its end. An anti-rotation tab of the locking key prevents it from rotating about the pinch bolt, and prevents the tang from coming out of the tang hole of the spindle.

Thus, movement of a boss along the spindle is prevented by the locking key. The crank arm can't be removed without first removing the pinch bolt.

Where such locking keys are used at the joint between a cylindrical steering tube of a bicycle's front forks and a slotted stem member having a pinch bolt to secure it to the end of the steering tube, the locking key not only prevents the stem member from coming off, but also serves as a safety key to prevent excessive and possibly dangerous rotation of the stem member in relation to the fork steering tube, while still allowing sufficient movement to give the cyclist warning that something is not right.

Accordingly, the invention has the following objects:

1. To provide a locking device which requires little machining.
2. To provide a locking device which adds little extra weight.
3. To provide a locking device which doesn't weaken a spindle.
4. To provide a locking device which positively prevents the crank arm from coming off, and which may act to prevent excessive turning of the boss in relation to the spindle or tube to which it is secured.
5. To provide a locking device which is tucked away within the existing structure, so as not to interfere with a cyclist's ankle.
6. To provide a locking device which is inexpensive to produce.
7. To provide a locking device which requires no additional tools to mount or remove.

BRIEF DESCRIPTION OF THE DRAWINGS:

FIG. 1 shows the end view of a serrated spindle mounting a crank arm boss which is slotted and secured by a pinch bolt. The end of a locking key is shown.

FIG. 2 is a sectional elevation of the spindle end and crank arm of FIG. 1, taken along line 2—2 of FIG. 1. Here, the locking key is shown in plan view.

FIG. 3 shows the features of the locking key shown in FIG. 2.

FIG. 4 shows the features of another locking key.

FIG. 5 shows the features of yet another locking key.

FIG. 6 shows the plan view of a stem boss secured to the end of a cylindrical steering tube.

FIG. 7 shows a section of the stem boss and steering tube of FIG. 6, taken along line 7—7 of FIG. 6.

DETAILED DESCRIPTION OF THE DRAWINGS

Referring to FIG. 1, a spindle 1 is shown to have an external serrations 3 machined into its end. A tang aperture 4 is shown near the end of said spindle 1. A crank arm means 5 has a boss portion 19 and a pinch bolt boss 6, and another pinch bolt boss 7 disposed on opposite sides of a slot 13. A locking key 11 is disposed within said slot 13. A pinch bolt 8 has a head 9 and a threaded body portion 10. The boss portion 19 of said crank arm means 5 has internal serrations 18 which engage said external serrations 3 of said spindle 1.

The threaded body portion 10 of said pinch bolt 8 inserts through a clearance hole 20 in said boss 6, inserts through a hole 12 (shown in FIG. 2) in said locking key 11, and engages internal threads in said pinch bolt boss 7. Said tang aperture 4 is seen to be in alignment with said slot 13.

In FIG. 2, said spindle 11 is partially sectioned to show said tang aperture 4, which is adapted for receiving a tang 14 of said locking key 11. The body portion 10 of said pinch bolt 8 is shown passing through said hole 12 of said locking key 11. An anti-rotation tab 17 of said locking key 11 prevents rotation of the locking key 11 about the pinch bolt body portion 10, and prevents said tang 14 from accidentally emerging from tang aperture 4.

Thus, the locking key 11 is adapted for engaging said pinch bolt 8 and for engaging said tang aperture 4, whereby axial movement of the crank arm 5 in relation to the spindle 1 is limited.

In FIG. 3, the locking key of FIG.'s 1 and 2 is shown by itself.

In FIG. 4, an alternate configuration of said locking key 11 is shown to have an anti-rotation tab 15 located at the tip of said tang 14, which prevents rotation of said locking key 11 about said pinch bolt body 10, thus preventing the accidental emergence of the locking key tang 14 from said tang aperture 4 of the spindle.

In FIG. 5, another configuration of the locking key 11 is shown. Here, the pinch bolt body is engaged by an arm 21 which abutts said pinch bolt body 10. The anti-rotation tab 17 prevents, in this case, the counter-clockwise rotation of the locking key 11 about the pinch bolt body 10. As before, the anti-rotation tab 15 prevents clockwise rotation of the locking key 11, and prevents the accidental emergence of the tang 14 from the tang aperture 4 of said spindle 1.

The locking key is thus adapted for engaging a pinch bolt, whereby axial movement of the crank arm in relation to the spindle is limited.

In FIG. 6 is shown the plan view of a bicycle stem boss 72 which is secured to a cylindrical steering tube 71 by a pinch bolt 75, which passes through a clearance hole 76, passes through a slot 74 of said stem boss 72, passes through a hole 81 (FIG. 7) in a locking key 78 (FIG. 7), and engages an internally-threaded hole 77 of said stem boss 72. Said cylindrical steering tube 71 slidably engages a cylindrical bore 83 in said stem boss 72.

In FIG. 7, said locking key 78 is shown to have a tang 80 which enters a tang aperture 79 of said cylindrical steering tube 71. An anti-rotation tab 82 of the locking key 78 prevents said tang 80 from coming out of said tang aperture 79.

It will be seen that said hole 12, in FIG's. 2, 3, and 4, comprises a pinch bolt engagement means, as does said hole 81 in FIG. 7. Another pinch bolt engagement means is comprised of said arm 21 and said anti-rotation tab 17 in FIG. 5. Such pinch bolt engagement means engage either said pinch bolt 10 or said pinch bolt 75.

MODE OF OPERATION

The crank arm means 5 slips onto the serrated spindle 1. The locking key 11 inserts into the slot 13 in said crank arm boss portion 19. Said tang 14 of said locking key 11 inserts into said tang aperture 4 of said spindle 1. Said pinch bolt body 10 inserts through said clearance hole 20, through said hole 12 of said locking key 11, and screws into the internal threads of said pinch bolt boss 7. Because of the anti-rotation tab 17, said locking key 11 cannot rotate in a clockwise manner, and the tang 14 is prevented from accidentally emerging from said tang aperture 4, thus preventing said crank arm means 5 from working its way off said spindle 1.

Said crank arm means 5 can only be removed after removing said pinch bolt 8.

Where the tang aperture is shown in the spindle to be a drilled hole, obviously, a slot would equally suffice to engage the tang of the locking key, as would a turned circumferential groove in the spindle. Such minor differences in construction would accomplish the same thing, and are considered to be within the scope of the invention.

I claim:

1. In a bicycle crankshaft, wherein a slotted, internally-serrated crank arm boss is secured to a correspondingly-serrated spindle by a pinch bolt, including a locking key mechanism the combination comprising:
  (a) a tang aperture in said spindle, in alignment with said slot of said crank arm boss;
  (b) a locking key positioned within said slot of said crank arm boss, said locking key including:
    (i) a tang portion for insertion into said tang aperture of said spindle;
    (ii) a pinch bolt engagement means for engaging said pinch bolt;
    (iii) an anti-rotation tab for preventing rotation of said locking key and for preventing the emergence of said tang portion from said tang aperture of said spindle,
whereby axial movement of the crank arm in relation to the spindle is prevented.

2. The combination according to claim 1, wherein said locking key pinch bolt engagement means is a hole in said locking key.

3. The combination according to claim 1, wherein said pinch bolt engagement means is an anti-rotation tab or arm integral with said locking key.

4. In a bicycle steering tube, wherein a slotted stem boss having a cylindrical bore slideably engages the cylindrical end of a steering tube, and is secured to it by a pinch bolt, including a locking key mechanism the combination comprising:
  (a) a tang aperture in the steering tube, aligned with said slot in said stem boss, said tang aperture adapted for receiving a tang of a locking key;
  (b) a locking key positioned within said slot of said stem boss, said locking key comprising:
    (i) a tang portion which inserts into said tang aperture of said bicycle steering tube;
    (ii) a pinch bolt engagement means for engaging said pinch bolt;
    (iii) at least one anti-rotation tab which prevents said tang portion from emerging from said tang aperture of said bicycle steering tube,
whereby axial movement of said slotted stem boss in relation to said bicycle steering tube is prevented.

5. The combination according to claim 4, wherein said locking key pinch bolt engagement means is a hole in said locking key.

6. The combination according to claim 5, wherein said locking key pinch bolt engagement means is an anti-rotation tab or an arm integral with said locking key.

* * * * *